(12) United States Patent
Gibby et al.

(10) Patent No.: US 8,251,590 B2
(45) Date of Patent: Aug. 28, 2012

(54) ANTI-ROTATION BEARING ASSEMBLY AND BEARING

(75) Inventors: Dale G. Gibby, Columbus, IN (US);
Joseph Rennekamp, Columbus, IN (US); Kent H. Clark, Columbus, IN (US)

(73) Assignee: Cummins Intellectual Properties, Inc., Minneapolis, MN (US)

( * ) Notice: Subject to any disclaimer, the term of this patent is extended or adjusted under 35 U.S.C. 154(b) by 451 days.

(21) Appl. No.: 12/475,042

(22) Filed: May 29, 2009

(65) Prior Publication Data

US 2010/0300244 A1 Dec. 2, 2010

(51) Int. Cl.
*F16C 17/02* (2006.01)
*F16C 9/04* (2006.01)

(52) U.S. Cl. ........................... 384/288; 384/294
(58) Field of Classification Search .................. 384/288, 384/294–296, 429, 430, 434, 503
See application file for complete search history.

(56) References Cited

U.S. PATENT DOCUMENTS

| | | | |
|---|---|---|---|
| 3,390,925 A * | 7/1968 | Fangman | 384/430 |
| 4,114,961 A * | 9/1978 | Pithie | 384/430 |
| 6,491,438 B1 * | 12/2002 | Ono et al. | 384/288 |
| 8,141,248 B2 * | 3/2012 | de Andrade Filho et al. | 29/888.02 |
| 8,147,144 B2 * | 4/2012 | Ishigo et al. | 384/288 |
| 2003/0161560 A1 | 8/2003 | Whitney | |
| 2005/0155451 A1 | 7/2005 | Abeln | |

FOREIGN PATENT DOCUMENTS

| | | |
|---|---|---|
| JP | 2000-179535 A | 6/2000 |
| JP | 2003-083349 A | 3/2003 |
| JP | 2006-097819 A | 4/2006 |

OTHER PUBLICATIONS

The International Search Report and the Written Opinion of the International Searching Authority with mailing date of Dec. 17, 2010; International Application No. PCT/US2010/036515.

* cited by examiner

*Primary Examiner* — Thomas R Hannon
*Assistant Examiner* — Matthew R Vaerewyck
(74) *Attorney, Agent, or Firm* — Studebaker & Brackett PC; Tim L. Brackett, Jr.

(57) ABSTRACT

A bearing component and bearing assembly are disclosed. The bearing component includes structure for providing a hard rotation stop, in one embodiment, the anti-rotation structure includes a slot formed in at least one bearing component having a surface for supporting a bearing shell. The slot has a longitudinal axis at an oblique angle to a plane perpendicular to the surface for supporting the bearing shell. In other embodiments, a groove extends radially outward from a surface of at least one component for supporting a bearing shell to a side of the component. The groove has a depth that increases as a function of distance in a direction parallel with a center axis of the component.

17 Claims, 2 Drawing Sheets

US 8,251,590 B2

ANTI-ROTATION BEARING ASSEMBLY AND BEARING

FIELD OF THE INVENTION

A bearing component and bearing assembly having structure for rotation stop are disclosed.

BACKGROUND

A bearing assembly is utilized in machinery to provide a low friction interface between one part rotating about another part. In a split bearing type assembly, a main body and a separable cap accept bearing shells and are joined together using fasteners to form a bearing for a crankshaft journal or other rotating component.

Over time, various methods of producing the main body and separable cap of a bearing assembly have been developed. For example, connecting rods frequently are fabricated by forming the main body and the bearing cap separately by casting or forging, and thereafter performing several finish machining steps before fitting the main body and the bearing cap with a bearing shell. Alternatively, the main body and cap can be formed together, and then separated by sawing or cutting away material originally connecting the main body and the cap. This method requires several machining steps including machining of connecting faces.

Another technique of separating the main body from the bearing cap by fracturing has also been employed in the industry. This involves fracturing the components along a predetermined fracture plane, which generally splits the main body from the bearing cap. When the fracturing takes place, the connecting faces between the main body and the bearing cap are not smooth, but instead having interlocking rough surfaces formed therein. These rough, complementary surfaces aid in correctly positioning the separated parts when they are rejoined.

SUMMARY

Embodiments consistent with the claimed invention relate to a bearing component including structure to prevent rotation of bearing shells.

In one exemplary embodiment consistent with the claimed invention, a bearing component for supporting a bearing comprises a first component including a first component including a first shell supporting surface, a central axis, and a joining surface provided at each end of the first shell supporting surface. A second component is positioned adjacent at least one of the joining surfaces of the first component and includes joining faces and a second shell supporting surface. At least one groove extends in a direction of the central axis and includes a depth extending radially outward from the first shell supporting surface of the first component, and the depth increases along the groove from the first shell supporting surface to a side of the first component.

In another embodiment consistent with the claimed invention, a connecting rod assembly includes a rod part having a first bearing shell supporting surface, and a first and second joining surface provided at each end of the first bearing shell supporting surface. The assembly includes a cap part having a second bearing shell supporting surface, and a third joining surface and a forth joining surface at respective ends of the second bearing shell supporting surface. A groove provided in the first bearing shell supporting surface of at least the rod part or the second bearing shell supporting surface of the cap part extends to a side surface of the rod part or cap part. When the first and third joining surfaces are fastened together, and the second and forth joining surfaces are fastened together, the first and second bearing shell supporting surfaces form a cylindrical surface, and the groove has a depth in a radial direction from an axis of the cylindrical surface that increases along the groove in the direction of the side.

In yet another aspect, a bearing shell comprises a semi-cylindrical shell having a concave journal supporting surface, a convex outer surface, first and second joint faces for abutting to joint faces of another semi-cylindrical shell, an end face at each side of the semi-cylindrical shell, and a tang formed at one of the first and second joint faces and positioned in a radially outwardly direction relative to the bearing shell center axis. The tang has a longitudinal axis at an oblique angle to a plane perpendicular to the concave journal supporting surface.

It is to be understood that both the foregoing general description and the following detailed description are exemplary and exemplary only and are not restrictive of the invention, as claimed.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention. In the drawings.

DETAILED DESCRIPTION

The various aspects are described hereafter in greater detail in connection with a number of exemplary embodiments to facilitate an understanding of the invention. However, the invention should not be construed as being limited to these embodiments. Rather, these embodiments are provided so that the disclosure will be thorough and complete, and will fully convey the scope of the invention to those skilled in the art.

Today's high performance engines require high performance components. These components include bearings and bearing assemblies, such as main journal bearings and connecting rod big end bearings, all of which must maintain a hydrostatic lubricating wedge between the bearing material and the component rotating about it. For reliable operation, the bearing assembly should provide a precision-located hard stop to prevent rotation of the bearing shells. In bearing retaining structures having machined surfaces, a hard rotation stop typically is provided as an offset slot and tang (also called a nick or notch) arrangement in which each of the upper and lower bearing shells is provided with tangs that fit into a respective slot formed in the machined main and cap parts of the bearing assembly. However, for fracture-split type connecting rods, the split surface is rough and not accurately positioned. Thus, the joining surfaces of a fracture-split type rod cannot provide a reliable hard stop. Additionally, providing a machined surface on each joining surface of a fracture-split rod would negate time and cost savings provided by fracture-split processes. Embodiments consistent with the invention provide a precision hard stop to prevent bearing rotation while being practical for machining and assembly.

Figure 1A:
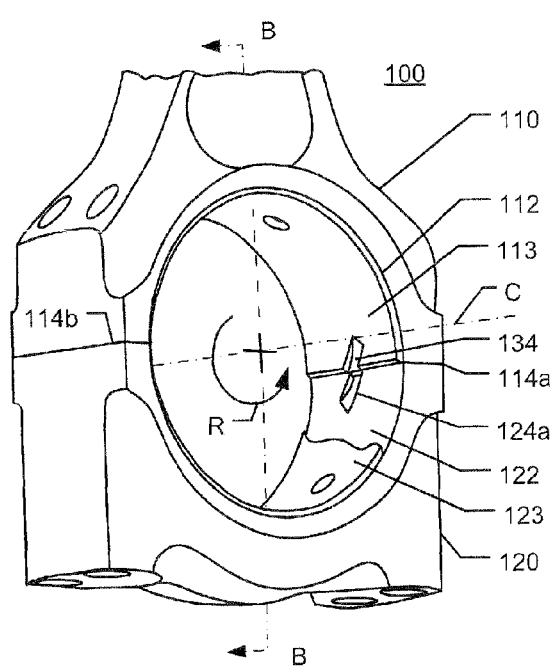
FIG. 1A is a perspective diagram showing a bearing assembly in accordance with an exemplary embodiment.

Referring now to the figures, FIG. 1A shows a partial view of a bearing assembly 100 in accordance with an exemplary embodiment of the invention. The bearing assembly 100 can be, for example, a connecting rod of an internal combustion engine. As shown in FIG. 1A, the bearing assembly 100 is a split bearing type that includes a rod part 110 and a cap part 120. The rod part 110 includes a surface 112 that supports a bearing shell 113, and the cap part 120 includes a surface 122 to support a shell component 123 (shown with a part cutaway). The surfaces 112 and 122 oppose each another to support the bearing shell components 113 and 123 when the cap and rod parts are fastened to one another at the interfaces 114a and 114b. Thus, the bearing shell components 113 and 123 can be maintained about a journal or shaft (not shown), such as a crankshaft journal, which can rotate about a center bore axis C of the bearing assembly 100 in the direction R, or in a direction opposite the depicted direction R. The inner surfaces 112 and 122 of the bearing assembly can have a semi-cylindrical shape, such that when joined, form a cylindrical surface.

To illustrate the interlocking features of the bearing shells 113/123 of the bearing assembly 100, a portion of the bearing shell 123 is removed in FIG. 1A near the tang and slot configuration. More particularly, a rotation stop is provided by an angled slot or groove 124a provided in the surfaces 112 and 122 across the interface 114a where a joining face of the rod part 110 meets a joining face of the cap part 120. In FIG. 1A, the slot 124a is shown partially covered by the upper bearing shell 113, which includes a tang 134 that fits into an upper portion of the slot 124a. Although not shown, when assembled, the split bearing assembly 100 would include a second tang on bearing shell 123 inserted into the lower portion of the slot 124a on the surface 122 of the cap part 120 such that the tangs of the bearing shells 113 and 123 face each another.

Figure 1B:
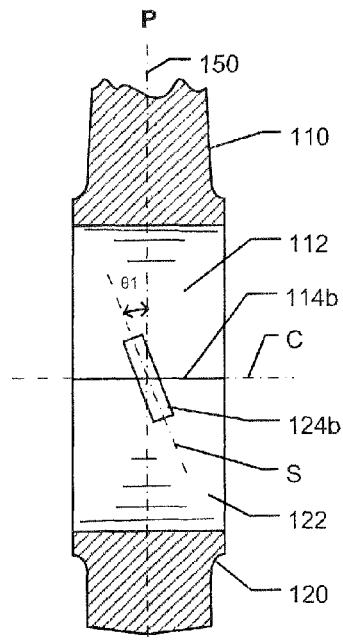
FIG. 1B is a cross-sectional side view of the bearing assembly shown in FIG. 1A taken along line B-B.

FIG. 1B is a cross section view of the rod bearing assembly 100 showing the side of the assembly opposite the slot 124a, and is shown without upper and lower bearing shells to depict the entire slot 124b across the interface 114b where a joining face of the rod part 110 meets a joining face of the cap part 120. As seen in FIG. 1B, a longitudinal axis S of the slot 124b makes an oblique angle θ1 to a plane P perpendicular to the surfaces 112 and 122 and axis C. Similarly, a longitudinal axis of the slot 124a makes an oblique angle θ1 to the plane P. Because the slots 124a/124b are provided at an angle to the direction of rotation R, forces acting on the bearing shells 123/113 in the direction of rotation would be counteracted by component forces in a direction opposite the direction of rotation, i.e., the surfaces of the slot acting on the tang 134. Also, the slots 124a/124b can provide counteracting component forces in the axial direction, that is, in the direction of the center bore axis C in reaction to any force that would cause a shift of a bearing shell in the axial direction. Thus, the angled slots can prevent both rotation and axial movement of the bearing shells. Additionally, an angled slot and tang provides a guide that can assist in proper placement of the bearing shells during assembly.

The slots 124a/124b in bearing assembly 100 shown in FIGS. 1A and 1B can be manufactured in a single machining setup using a cutting tool, such as a milling cutter. For example, the same milling tool can be used to cut slots 124a/124b at the same oblique angle. Specifically, a wheel shaped cutter can be inserted into the opening formed by the assembled rod part and cap and moved into abutment against the surfaces 112, 122 at the interface 114 to form an arc-shaped slot having a curved surface defined by the radius of the wheel cutter. Alternatively, slots in other embodiments can be provided using different oblique angle orientations, such as slots that are angled in opposite directions relative to one another. In another embodiment, only one obliquely angled slot is provided in a bearing assembly.

The tang 134 in each of the bearing shells 113, 123 is generally pressed from the wall of the shell material by shearing in a press tool so as to form a tongue which extends radially outwardly beyond the diameter of the bearing shell's back surface to locate in the slot 124a/124b in a cooperating manner.

Figure 2:
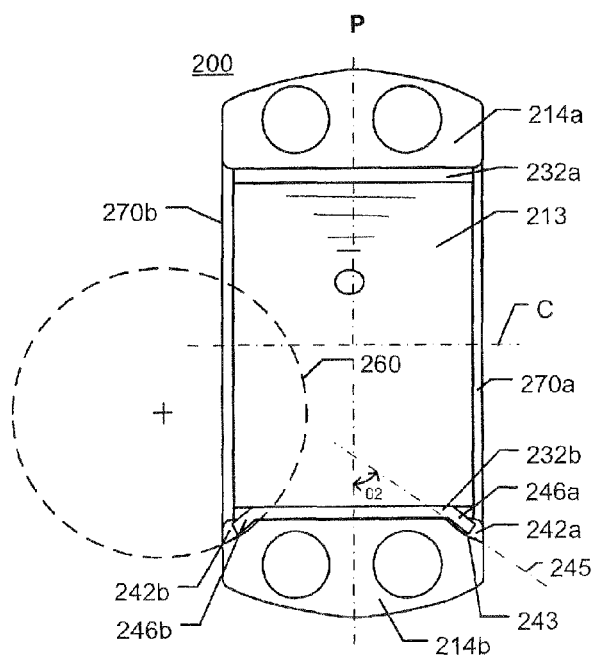
FIG. 2 is a plan view of a main or cap part of a bearing assembly in accordance with an exemplary embodiment.

FIG. 2 shows a component 200 of a bearing assembly including a hard rotation stop according to an exemplary embodiment. The component 200 can be a main part or a cap part of a bearing assembly of, for example, a connecting rod such as a fracture-split type connecting rod. The bearing assembly component 200 includes a bearing shell 213 having end portions 232a and 232b, and joining surfaces 214a and 214b. Joining surface 214b includes two notch-like grooves 242a and 242b at the corners to provide machined positive rotation stops, although as few as one notch may be provided at the periphery of the component. The grooves 242a and 242b can have a width substantially equal to a width of a respective tang 246a and 246b provided at the corners of one side of the bearing shell 213, i.e., similar to the width of the slots of the embodiment of FIGS. 1A and 1B. Grooves 242a and 242b also include a depth, extending radially outwardly from the inner cylindrical surfaces of the main part and/or cap part, sufficient to accommodate a bent portion of the tang.

Figure 3:
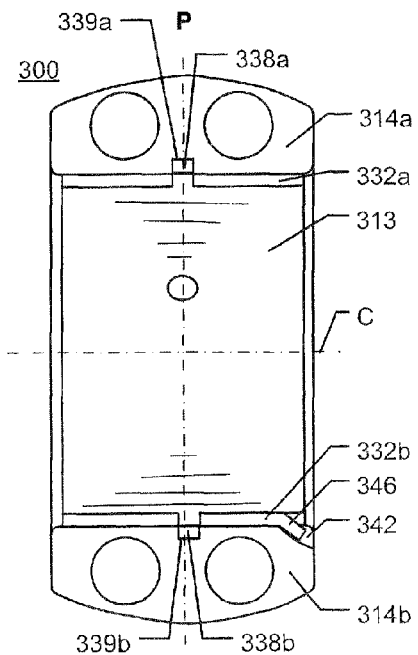
FIG. 3 is a plan view of a main or cap part of a bearing assembly in accordance with exemplary embodiments.

The grooves 242a, 242b can be precisely made in component 200 using a horizontal mill with a milling shaft supported at both ends, which is schematically represented as 260 in FIG. 3. With the component assembled with its complementary part (e.g., a cap part if component 200 is a main rod part or a main rod part if component 200 is a cap part), or prior to fracture splitting a main part from a cap part in a fracture-split rod embodiment, the two parts can be milled at once to form a groove including adjacent machined notches. In such an embodiment, when the bearing assembly is assembled with the bearing shells, the tang 246a would abut another similar tang in the bearing shell of the complementary part (not shown). Hence, a single machining setup can precisely cut anti-rotation grooves for both bearing shell halves of one side of a bearing assembly, although embodiments utilizing grooves providing notches on both sides of a bearing shell, such as shown in FIG. 2, would require more than one machining setup, but would effectively prevent axial movement of the bearing shell in both directions along central bore axis C.

In FIG. 2, the circular cutting tool 260 is of sufficient radius that it forms a groove having a slightly curved side 243, and whose endpoints on the bottom surface of the groove define a line 245 that extends through the plane P at an oblique angle θ2. Alternatively, a cutting mill can be set up to mill a groove having a straight side section. Using either method, the depth of the groove 242a increases as a function of distance in a direction parallel with the central bore axis C to a side 270a of component 200 to provide a hard rotation stop for tang 246a formed in the corner of the bearing shell 213, and thus prevents bearing shell 213 from rotating. Likewise, the depth of the groove 242b increases as a function of distance in a direction parallel with the axis C toward a side 270b of the component 200 to provide a hard rotation stop for tang 246b formed in the corner of the bearing shell 213.

The tangs 246a and 246b in the bearing shell 213 can generally be pressed from the wall of the shell material by shearing in a press tool so as to form a tang which extends radially outwardly beyond the diameter of the bearing shell's back surface to locate in the slot 124a/124b in a cooperating manner.

The embodiment shown in FIG. 2 having a groove formed at the joining surfaces 214a, 214b allows for "rolling in" the bearing shell 213 during assembly, although other embodiments can include only one groove, or more than one groove at any location along the circumference of the bearing assembly.

FIG. 3 shows a component 300 of a bearing assembly embodiment including a single notch-like groove 342 and corresponding tang 346 of a bearing shell 313 as described above relative to one of the grooves and tangs of the embodiment of FIG. 2, but the FIG. 3 embodiment also includes at least one conventional tang structure to prevent axial movement along the direction of the central bore axis C. For instance, a tang 338a or 338b can be provided at end 332a or 332b and/or side of the bearing shell 313 and fit into a groove formed in the joining surface 314a or 314b of the component 300. It will be appreciated that a tang 338a or 338b and respective grooves 339a and 339b can be provided at any location along the sides 332a and/or 332b of the bearing shell 313. It also will be understood that component 300 is part of a bearing assembly including a complementary component supporting another bearing shell (e.g., a cap part if component 300 is a main rod part or a main rod part if component 300 is a cap part). The complementary component can include a notch such that it would be adjacent the notch 342 when assembled with the component 300. Additionally, a complementary bearing assembly part to be attached with component 300 to form a bearing assembly can include one or more of the conventional tang/groove structures, such as tangs 338a or 338b and respective grooves 339a and 339b, and can be located anywhere along the bearing shell ends. However, it may be desirable that a tang in the component 300 does not face a tang provided in a complementary component. Alternatively, the component 300 can include the notch and tang 342/346, but tang/groove structure 338a/339a or 338b/339b is provided only in the complementary part.

Figure 4:
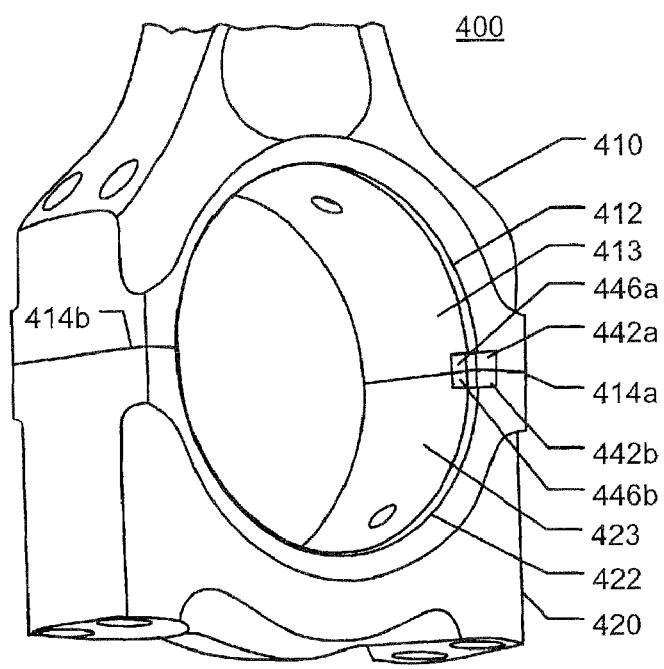
FIG. 4 is a perspective diagram of a bearing assembly in accordance with an exemplary embodiment.

FIG. 4 shows an exemplary embodiment of complementary bearing assembly parts including adjacent notches that can be used, for example, as portions of a connecting rod component of an internal combustion engine. As shown in FIG. 4, a bearing assembly 400 is a split bearing type that includes a rod part 410 and a cap part 420. The rod part 410 includes a surface 412 that supports a bearing shell 413, and the cap part 420 includes a surface 422 to support a shell component 423. The surfaces 412 and 422 oppose each another to support the bearing shell components 413 and 423 when the cap and rod parts are fastened to one another at the interfaces 414a and 414b. Thus, the bearing shell components 413 and 423 can be maintained about a journal or shaft (not shown); such as a crankshaft journal, which can rotate about a center bore axis of the bearing assembly. The inner surfaces 412 and 422 of the bearing assembly can have a semi-cylindrical shape, such that when joined, form a cylindrical surface.

The rod part 410 of bearing assembly 400 includes a machined notch-like groove 442a, into which can extend a corresponding tang 446a of the bearing shell 413. The cap part 420 of the bearing assembly 400 includes a machined notch-like groove 442b, and a tang 446b can extend into the groove 442b. For example, each of the grooves 442a/442b and tangs 446a/446b can be provided in a manner similar to those described in the above embodiments of FIG. 2 or FIG. 3. In the FIG. 4 embodiment, the grooves 442a and 442b are provided adjacent to each other. This provides an arrangement in which one side of the tang 446a can abut one side of the other tang 446b upon assembling the cap part 420 and the rod part 410, and the non-abutting side of the tang 446a is provided next to a machined side part of the groove 442a and the non-abutting side of the tang 446b is provided next to the machined side part of the groove 442b.

Figure 5:
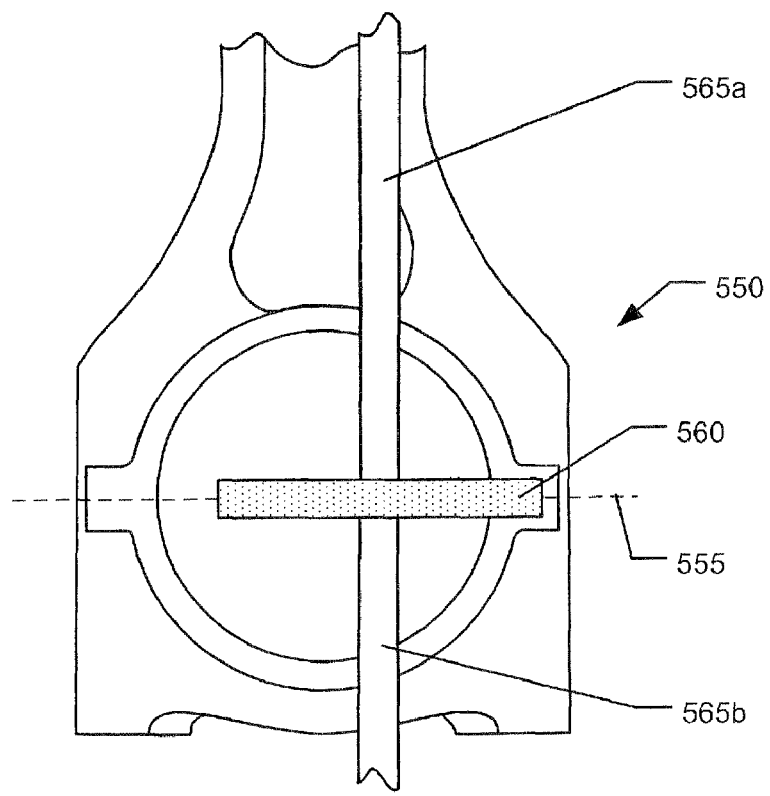
FIG. 5 is a side view of a bearing assembly part showing a cutting process prior to fracturing the bearing assembly part in accordance with an exemplary embodiment.

FIG. 5 shows an exemplary process for precisely and easily forming adjacent grooves in a bearing assembly prior to a fracture-splitting step. As shown in FIG. 5, a single bearing piece 550, for example, a rod piece can be machined using a horizontal mill, which is shown as a cutter 560 supported at each end by one of the shafts 565a and 565b. The a rod piece has a frangible zone represented by the area of the bearing piece 550 along dotted line 555. The frangible zone 555 is an area that is to be fractured so the bearing part is split into two pieces, which can be reassembled after inserting the bearing shells (not shown) into the center bore area of each of the pieces. As the cutter 560 of the horizontal mill cuts a notch into the bearing piece 550 along the frangible zone 555, it provides machined rotation stops at either side of the frangible zone 555 where the bearing piece 550 is to be split. It is to be understood that other embodiments may include a bearing piece can having shape in which the frangible zone is provided in another orientation from the rod part. Further, one or more notch can be provided anywhere along the circumference of the bearing piece 550 (i.e., along the side of the center bore) and/or on the opposite side of the bearing piece 550. Additionally, any of the embodiments described herein may be used in one of many combinations. For example, the embodiments of FIGS. 2 to 4 can also include a slot like configuration as shown in FIG. 1, and/or all embodiments can be provided along with conventional tangs, such as those shown in FIG. 3.

It will be appreciated that the embodiments described and shown herein may be modified in a number of ways. For instance, while embodiments comprising fracture-split connecting rods can be provided with a reliable, precision rotation stop, it should be readily recognized that the concepts described herein are not limited to one such specific engine part, but can be applied to a wide range of other parts that must be separated for assembly around another component, such as journal boxes. Likewise, while the above components have been described with regard to the use of fracture splitting forged or cast parts, embodiments can include parts made using other applications, such as powder metallurgy, die casting etc., and/or use manufacturing processes to tailor each part's properties depending on structure requirements. Further, an embodiment can include a component in a bearing assembly (e.g., a main part) that is produced by a different method and/or material than another component (e.g., a cap part).

Although a limited number of embodiments is described herein, one of ordinary skill in the art will readily recognize that there could be variations to any of these embodiments and those variations would be within the scope of the appended claims. Thus, it will be apparent to those skilled in the art that various changes and modifications can be made to the bearing component and bearing assembly described herein without departing from the scope of the appended claims and their equivalents.

What is claimed is:

1. A bearing component for supporting a bearing, comprising:
   a first component including a first side surface, a second side surface, a first shell supporting surface between the first and second side surfaces, a central axis, a first joining surface at a first end of the first shell supporting surface, and a second joining surface at a second end of the first shell supporting surface;
   a second component including third side surface, a fourth side surface, a second shell supporting surface between the third and fourth side surfaces, a third joining surface at a first end of the second shell supporting surface, and a fourth joining surface at a second end of the second shell supporting surface, said second component positionable with the first component such that the first joining surface is adjacent to the third joining surface and the second joining surface is adjacent to the fourth joining surface to retain a bearing between the first and second shell supporting surfaces; and
   a first groove in said first shell supporting surface and extending in a direction of the central axis, said first groove extending radially outwardly from the first shell supporting surface and including a depth that continuously increases along said first groove in the direction of the central axis from said first shell supporting surface to the first side surface of the first component.

2. The bearing component of claim 1, further comprising a first bearing shell including a tang that protrudes into the first groove.

3. The bearing component of claim 1, wherein the first and third joining surfaces, and the second and fourth joining surfaces align to form a cylindrical bore.

4. The bearing component of claim 1, wherein the first and third joining surfaces, and the second and fourth joining surfaces have matched interfitting surfaces formed by fracture-splitting the first component from the second component.

5. The bearing component of claim 1, wherein the first shell supporting surface and the second shell supporting surface each have a semi-cylindrical shape.

6. The bearing component of claim 1, further comprising a second groove in the second shell supporting surface and extending in a direction of the central axis, said second groove extending radially outwardly from the second shell supporting surface and including a depth that increases along said second groove in the direction of the central axis from said second shell supporting surface to the third side surface of the second component.

7. The bearing component of claim 6, wherein, with the first joining surface aligned with the third joining surface, and with the second joining surface aligned with the fourth joining surface, the first and second grooves are positioned such that they are directly adjacent to one another.

8. A connecting rod assembly, comprising:
   a rod part including a first bearing shell supporting surface, and a first and second joining surface at each end of the first bearing shell supporting surface;
   a cap part including a second bearing shell supporting surface, and a third joining surface and a forth joining surface at respective ends of the second bearing shell supporting surface; and
   a first groove in at least one of the first bearing shell supporting surface of the rod part and the second bearing shell supporting surface of the cap part, wherein with the first and third joining surfaces fastened together and the second and forth joining surfaces fastened together, the first and second bearing shell supporting surfaces form a cylindrical surface between a first side surface of the connecting rod assembly and a second side surface of the connecting rod assembly opposite to the first side surface, said groove extends along a direction of a central axis of the cylindrical surface to the first side surface, and a depth of said groove continuously increases the direction of the central axis toward the first side surface.

9. The connecting rod assembly of claim 8, wherein the first and third joining surfaces, and the second and forth joining surfaces have matched interfitting surfaces formed by fracture-splitting the rod part from the cap part.

10. The connecting rod assembly of claim 8, further comprising a first bearing shell including a tang that protrudes into the first groove.

11. The connecting rod assembly of claim 8, further comprising a second groove in the other of the first bearing shell supporting surface of the rod part and the second bearing shell supporting surface of the cap part, wherein said second groove extends in the direction of the central axis and has a depth along said second groove that increases in the direction of the central axis.

12. The connecting rod assembly of claim 11, wherein, with the first and third joining surfaces aligned and the second and forth joining surfaces aligned, the first and second grooves are positioned such that they are directly adjacent to one another.

13. The connecting rod assembly of claim 11, wherein the second groove extends along the central axis to the second side surface.

14. The connecting rod assembly of claim 8, wherein the entire cylindrical surface is between the first and second side surfaces of the connecting rod assembly.

15. A bearing shell, comprising:
   a shell having a concave semi-cylindrical shaped journal supporting surface with a center axis;
   a convex outer surface;
   first and second joint faces configured to abut to joint faces of another shell;
   a first end face connecting a first end of the first joint face to a first end of the second joint face and a second end face connecting a second end of the first joint face to a second end of the second joint face such that the semi-cylindrical shaped journal supporting surface is between said first and second end faces; and
   a tang formed at a first end of the first joint face and an end of the first end face, said tang positioned in a radially outwardly direction relative to the center axis and having a longitudinal axis at an oblique angle to a plane perpendicular to the concave journal supporting surface.

16. The bearing shell of claim 15, further comprising:
   a second tang formed at second end of the first joint face and at an end of the second end face, said second tang positioned in a radially outwardly direction relative to the bearing shell center axis and having a longitudinal axis at an oblique angle to a plane perpendicular to the concave semi-cylindrical shaped journal supporting surface.

17. The bearing shell of claim 15, further comprising:
   a second tang formed at one of the first and second joint faces, said second tang positioned in a radially outwardly direction relative to the bearing shell center axis and having a longitudinal axis parallel to a plane perpendicular to the concave semi-cylindrical shaped journal supporting surface.

* * * * *